(12) United States Patent
Lin et al.

(10) Patent No.: US 11,331,802 B2
(45) Date of Patent: May 17, 2022

(54) METHOD FOR IMITATION OF HUMAN ARM BY ROBOTIC ARM, COMPUTER READABLE STORAGE MEDIUM, AND ROBOT

(71) Applicant: UBTECH ROBOTICS CORP LTD, Shenzhen (CN)

(72) Inventors: Zecai Lin, Shenzhen (CN); Zhaohui An, Shenzhen (CN); Zheng Xie, Shenzhen (CN); Yizhang Liu, Shenzhen (CN); Youjun Xiong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 279 days.

(21) Appl. No.: 16/734,393

(22) Filed: Jan. 5, 2020

(65) Prior Publication Data
US 2021/0146538 A1   May 20, 2021

(30) Foreign Application Priority Data
Nov. 19, 2019  (CN) .......................... 201911134999.8

(51) Int. Cl.
*B25J 9/16*   (2006.01)
*B25J 13/08*   (2006.01)

(52) U.S. Cl.
CPC .......... *B25J 9/1664* (2013.01); *B25J 13/088* (2013.01)

(58) Field of Classification Search
CPC ...... B25J 9/1664; B25J 13/088; B25J 9/1666; B25J 9/1602; G05B 2219/40317
USPC .................................................. 700/245–264
See application file for complete search history.

(56) References Cited

U.S. PATENT DOCUMENTS

| 4,680,519 | A * | 7/1987 | Chand | G05B 19/4086 700/62 |
| 4,975,856 | A * | 12/1990 | Vold | B25J 9/1602 318/568.19 |
| 7,024,276 | B2 * | 4/2006 | Ito | G06N 3/008 700/245 |
| 8,380,348 | B2 * | 2/2013 | Neki | H02J 7/0045 700/245 |
| 8,774,967 | B2 * | 7/2014 | Ooga | B25J 9/1633 700/245 |
| 9,162,720 | B2 * | 10/2015 | Mistry | B62D 57/032 |
| 11,000,222 | B2 * | 5/2021 | Chakravarty | A61B 5/4528 |
| 2007/0010913 | A1 * | 1/2007 | Miyamoto | B25J 9/1658 700/264 |
| 2007/0150105 | A1 * | 6/2007 | Orita | B62D 57/032 700/245 |

(Continued)

FOREIGN PATENT DOCUMENTS

CN         106313049 A      1/2017

OTHER PUBLICATIONS

Billard et al, Learning human arm movements by imitation: Evaluation of a biologically inspired connectionist architecture, 2001, ELSEVIER, Robotics and Autonomous Systems 37 (2001) 145-160 (Year: 2001).*

(Continued)

*Primary Examiner* — Jaime Figueroa

(57) ABSTRACT

A method for controlling an arm of a robot to imitate a human arm, includes: acquiring first pose information of key points of a human arm to be imitated; converting the first pose information into second pose information of key points of an arm of a robot; determining an angle value of each joint of the arm according to inverse kinematics of the arm based on the second pose information; and controlling the arm to move according to the angle values.

20 Claims, 11 Drawing Sheets

(56) References Cited

U.S. PATENT DOCUMENTS

| | | | | |
|---|---|---|---|---|
| 2010/0295771 | A1* | 11/2010 | Burton | A63F 13/213 |
| | | | | 382/103 |
| 2012/0143374 | A1* | 6/2012 | Mistry | B62D 57/032 |
| | | | | 700/259 |
| 2012/0158174 | A1* | 6/2012 | Moon | G06N 3/008 |
| | | | | 700/245 |
| 2012/0173019 | A1* | 7/2012 | Kim | B25J 9/1669 |
| | | | | 700/245 |
| 2015/0051734 | A1* | 2/2015 | Zheng | B25J 9/1633 |
| | | | | 700/261 |
| 2019/0167363 | A1* | 6/2019 | Cohen | A61B 17/29 |
| 2019/0291277 | A1* | 9/2019 | Oleynik | B25J 9/162 |
| 2019/0358817 | A1* | 11/2019 | Ghazaei Ardakani | |
| | | | | B25J 13/025 |
| 2020/0054276 | A1* | 2/2020 | Chakravarty | G16H 20/30 |

OTHER PUBLICATIONS

Mavridis et al, Real-time Teleoperation of an Industrial Robotic Arm Through Human Arm Movement Imitation, 2010, ACADEMIA, Proceedings of the 2010 International Symposium on Robotics and Intelligent Sensors (IRIS2010) Nagoya University, Nagoya, Japan, Mar. 8-11, 2010. pp 288-293 (Year: 2010).*

Filiatrault et al, Human Arm Motion Imitation by a Humanoid Robot, 2014 IEEE International Symposium on Robotic and Sensors Environments (ROSE) Proceedings, 2014, pp. 31-36, doi: 10.1109/ROSE.2014.6952979. (Year: 2014).*

H. Lin, Y. Liu and C. Chen, "Evaluation of human-robot arm movement imitation," 2011 IEEE, Proceedings of 2011 8th Asian Control Conference (ASCC), Kaohsiung, Taiwan, May 15-18, 2011, pp. 287-292. (Year: 2011).*

Perrin et al, Real-time footstep planning for humanoid robots among 3D obstacles using a hybrid bounding box, 2012, IEEE, International Conference on Robotics and Automation River Centre, Saint Paul, Minnesota, USA May 14-18, 2012, pp. 977-982 (Year: 2012).*

A. Durdu, H. Cetin and H. Komur, "Robot imitation of human arm via Artificial Neural Network, 2014, IEEE," Proceedings of the 16th International Conference on Mechatronics—Mechatronika 2014, 2014, pp. 370-374, doi: 10.1109/MECHATRONIKA.2014.7018286. (Year: 2014).*

* cited by examiner

METHOD FOR IMITATION OF HUMAN ARM BY ROBOTIC ARM, COMPUTER READABLE STORAGE MEDIUM, AND ROBOT

CROSS REFERENCE TO RELATED APPLICATIONS

This application claims priority to Chinese Patent Application No. 201911134999.8, filed Nov. 19, 2019, which are hereby incorporated by reference herein as if set forth in its entirety.

BACKGROUND

1. Technical Field

The present disclosure generally relates to robots, and particularly to a method for imitation of a human arm by a robotic arm.

2. Description of Related Art

Robotic arms are mechanically controlled devices designed to replicate the movement of a human arm. The devices are used for lifting heavy objects and carrying out tasks that require extreme concentration and expert accuracy. The robotic arm most often is used for industrial and nonindustrial purposes.

In order to let humanoid robots have similar behavior with human, motion planning is crucial. However, planning humanlike motions for robots is very complicated because it needs to handle multiple degrees of freedom (DOFs) simultaneously. The idea is to generate human-like motions by extracting information directly from human motion via a motion capture system, such as the Kinect sensor developed by the Microsoft Corporation. One problem with some conventional methods for imitation of a human arm by a robotic arm is that the imitation similarity methods is low.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
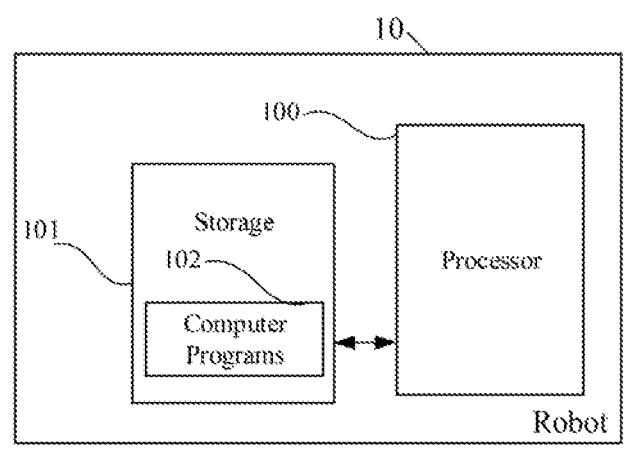
FIG. 1 is a schematic block diagram of a robot according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

FIG. 1 is a schematic block diagram of a robot according to an embodiment. The robot 10 includes a processor 100, a storage 101, one or more computer programs 102 stored in the storage 101 and executable by the processor 100. When the processor 100 executes the computer programs 102, the steps in the embodiments of the method for controlling the robot 10, such as steps S101 through S104 in FIG. 2, steps S201 through S205 in FIG. 3, steps S401 through S403 in FIG. 5, steps S601 through S605 in FIG. 7, and steps S801 through S804 in FIG. 9, and functions of modules/units in the embodiments, such as units 91 through 94 in FIG. 10, are implemented.

The type of the robot 10 may be arbitrary, for example, a service robot and a humanoid robot. A person having ordinary skill in the art can understand that FIG. 1 is only an example of the robot 10 and does not constitute a limitation on the robot 10. The robot may include more or fewer parts than those illustrated, or a combination of some parts, or different parts. For example, the robot can further include input and output devices, network access devices, chassis, arms, etc.

The processor 100 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 101 may be an internal storage unit of the robot 10, such as a hard disk or a memory. The storage 101 may also be an external storage device of the robot 10, such as a plug-in hard disk, a smart memory card (SMC), and a secure digital (SD) card, or any suitable flash cards. Furthermore, the storage 101 may also include both an internal storage unit and an external storage device. The storage 101 is used to store computer programs, other programs, and data required by the robot. The storage 101 can also be used to temporarily store data that have been output or is about to be output.

Figure 2:
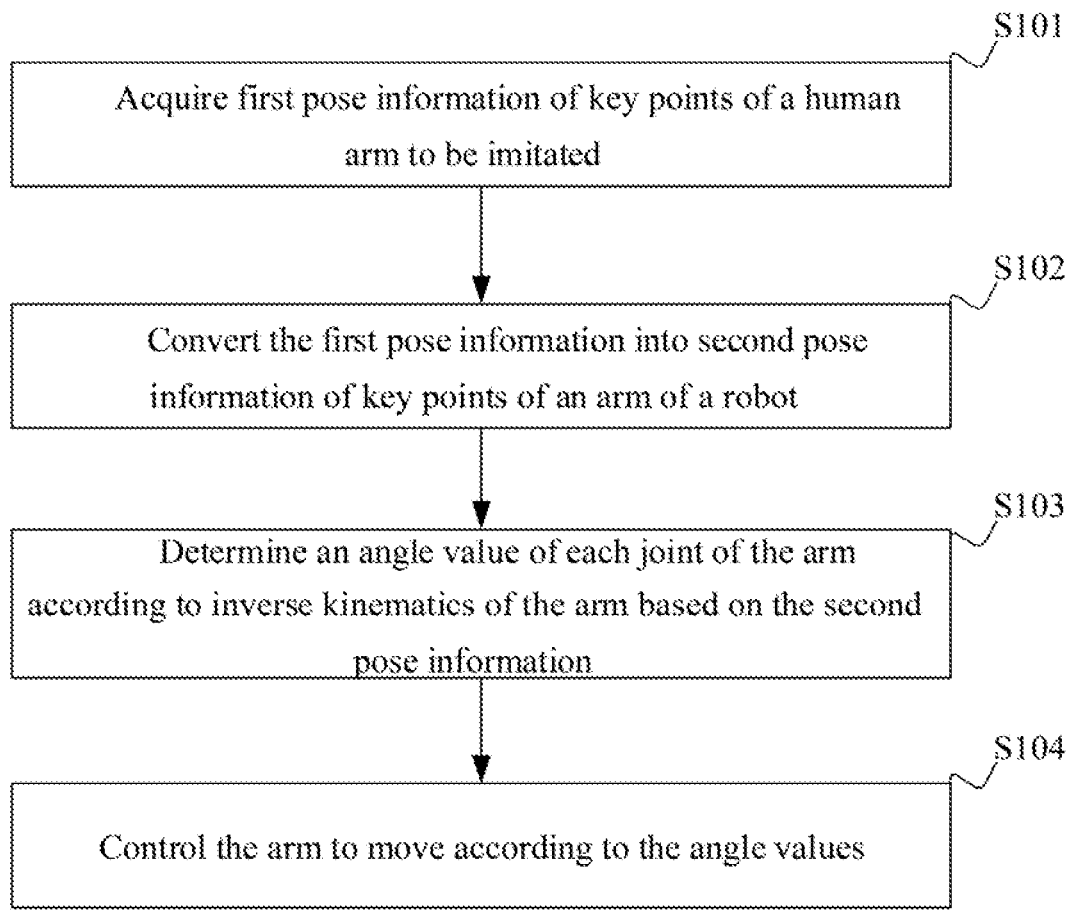
FIG. 2 is a flow chart of a method for controlling the robot of FIG. 1 according to one embodiment.

FIG. 2 is a flow chart of method for controlling an arm of the robot 10 to imitate a human arm according to one embodiment. In the embodiment, the method includes the following steps:

Step S101: acquiring first pose information of key points of a human arm to be imitated.

It should be noted that first pose information of key points of two human arms may also be acquired according to need.

That is, the method of the embodiment can control one or two robotic arms to respectively imitate one or two human arms.

The key points of the human arm to be imitated are preset, and include, but are not limited to, the shoulder, the elbow, and the wrist of a single arm. The first pose information includes position information and orientation information.

In some embodiments, the pose information of the shoulder, the elbow, and the wrist of a human arm can be collected through an infrared positioning system. Specifically, infrared reflective balls/markers are attached to the arm to be imitated, and the movement information of the human arm is obtained in real time by using infrared positioning technology when the arm moves. The motion information includes pose information of the shoulder, the elbow, and the wrist with respect to a shoulder coordinate system. It should be noted that, in other embodiments, the pose information of the key points of the human arm to be imitated may also be collected in other ways.

Step S102: converting the first pose information into second pose information of key points of the arm of the robot 10.

It should be noted that the length of the arms is different for different people, and the poses of human arms cannot be directly assigned to the key points of the robot arm. The collected movements need to be mapped to transform the poses of the key points of the arms of different people into the poses of the key points of the robot arm. The process of converting the first pose information into the second pose information can be regarded as a mapping process of the movement. That is, the pose information of the human arm is converted into the pose information of the robot arm to map the motion of the human arm to the robot arm.

Figure 3:
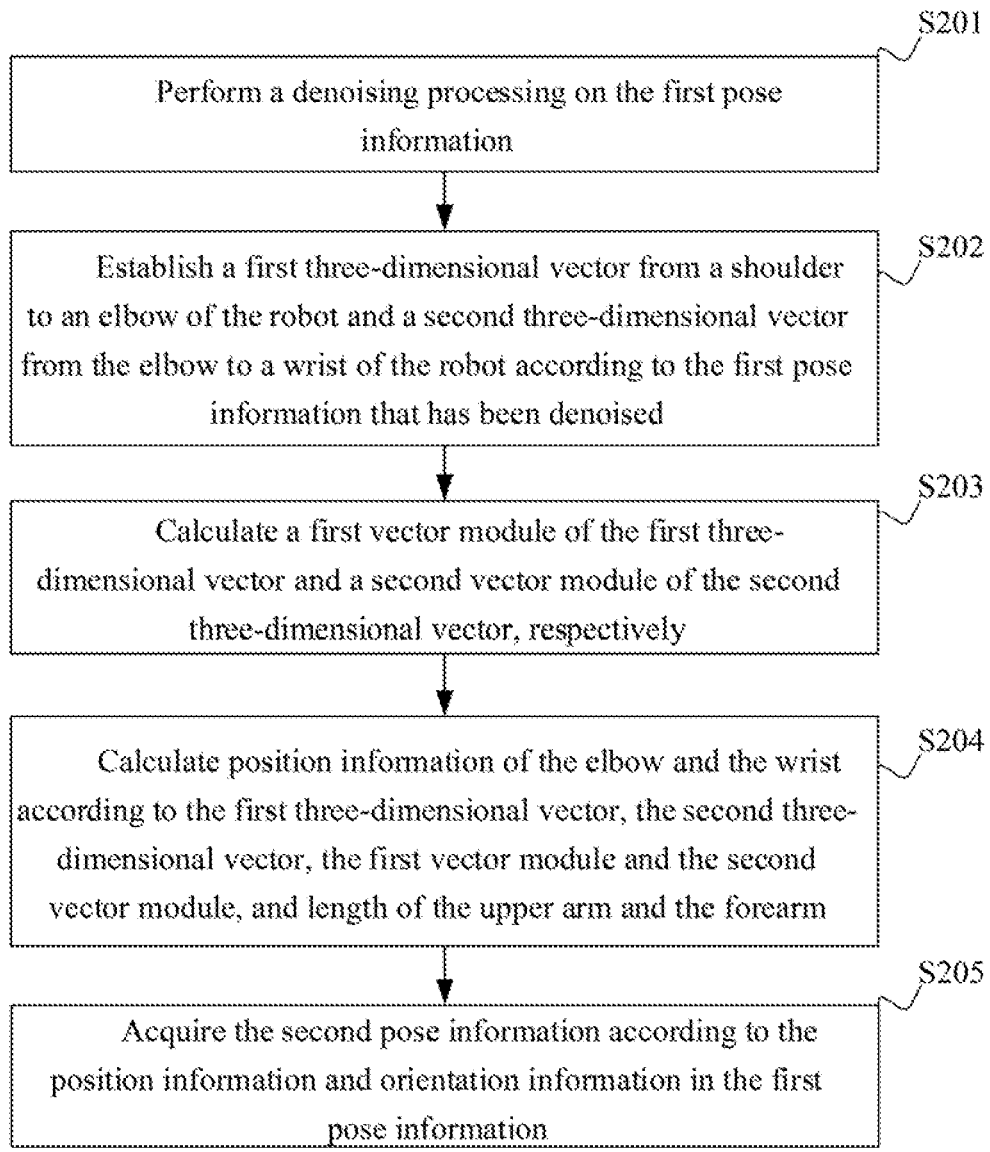
FIG. 3 is a flow chart of a step S102 of the method of FIG. 1.

Referring to FIG. 3, in one embodiment, the step S102 includes the following steps:

Step S201: performing a denoising processing on the first pose information.

It should be noted that, in other embodiments, the first pose information may not be denoised, and the purpose of the embodiments can also be achieved. However, due to the influence of factors such as the working environment and sensors own noise, denoising the collected data can ensure the smoothness and stability of the movement imitation.

Step S202: establishing a first three-dimensional vector from a shoulder to an elbow of the robot and a second three-dimensional vector from the elbow to a wrist of the robot according to the first pose information that has been denoised.

Figure 4:
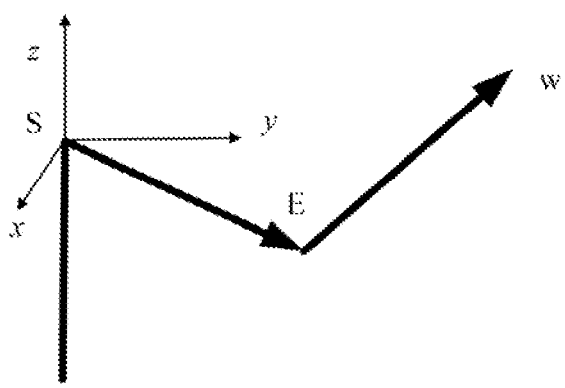
FIG. 4 is a schematic diagram of a three-dimensional vector of the key parts of a human arm.

The first pose information includes position information and orientation information of the shoulder, the elbow, and the wrist of the human arm. Referring to the schematic diagram of the three-dimensional vectors of key parts of the human arm shown in FIG. 4 and the formula $$\begin{cases} \bar{r}_{SE} = P_E - P_S \\ \bar{r}_{EW} = P_W - P_E \end{cases},$$

three-dimensional vectors are established using the position information of the shoulder, the elbow and the wrist, where $P_E$ represents the position information of the key points of the elbow of the arm to be imitated, $P_S$ represents the position information of the key points of the shoulder of the arm to be imitated, $P_W$ represents the position information of the key points of the wrist of the arm to be imitated, $\bar{r}_{SE}$ represents the first three-dimensional vector, $\bar{r}_{EW}$ represents the second three-dimensional vector.

Step S203: calculating a first vector module of the first three-dimensional vector and a second vector module of the second three-dimensional vector, respectively.

Step S204: calculating position information of the elbow and the wrist according to the first three-dimensional vector, the second three-dimensional vector, the first vector module and the second vector module, and length of the upper arm and the forearm.

It should be noted that the first three-dimensional vector is a vector from the shoulder to the elbow. The first vector module is thus equal to the length of the upper arm of the human arm to be imitated. Similarly, the second vector module is equal to the length of the forearm of the human arm to be imitated. After the length of the upper arm and forearm of the human arm is obtained, it can then determine which points of the human arm are mapped to the positions of various key parts of the robot arm according to the ratios of the vector modules to the length of the upper arm and the forearm of the robot arm.

In one embodiment, the position information of the elbow and the wrist in step S204 is respectively calculated according to $$P_E^r = \frac{l_{SE}\bar{r}_{SE}}{|\bar{r}_{SE}|} \text{ and } P_W^r = \frac{l_{SE}\bar{r}_{SE}}{|\bar{r}_{SE}|} + \frac{l_{EW}\bar{r}_{EW}}{|\bar{r}_{EW}|},$$

where $P_E^r$ and $P_W^r$ represent respectively the position coordinates of the elbow and the wrist, $l_{SE}$ represents the length of the upper arm, $l_{EW}$ represents the length of the forearm, $|\bar{r}_{SE}|$ represents the first three-dimensional vector, $|\bar{r}_{SE}|$ represents the first vector module, $\bar{r}_{EW}$ represents the second three-dimensional vector, and $|\bar{r}_{EW}|$ represents the second vector module. With the steps S203 and S204, the motion of the human arm is mapped onto the robot arm, ensuring the similarity of the motion imitation.

Compared with some conventional control methods that obtain the sizes of the upper arm and the forearm of a human arm by establishing a three-dimensional model of each human body, the embodiment of the present disclosure implements motion mapping based on pose information, which is relatively easy to implement.

At this point, the position information of the key points of the robot arm after the motion mapping can be determined.

Step S205: acquiring the second pose information according to the position information and orientation information in the first pose information.

In the embodiment, the orientation information of the key points of the robot arm is equal to the orientation information of the human arm to be imitated. That is, the orientation information in the first pose information is used as the orientation information in the second pose information. In this way, the second pose information of the key points of the robot arm after the motion mapping can be obtained, according to the calculated position information and the orientation information in the first pose information.

Figure 5:
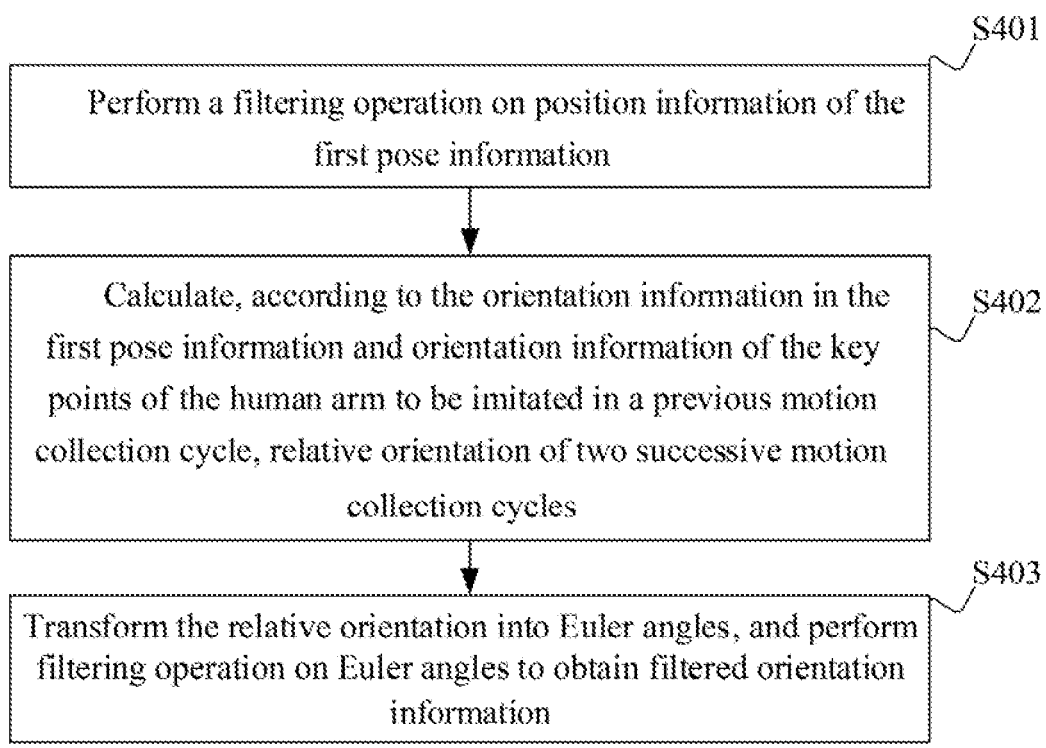
FIG. 5 is a flow chart of a step S201 of the method of FIG. 3.

It should be noted that the data denoising in step S201 may be achieved by any conventional denoising method. However, some conventional denoising methods may not guarantee the accuracy of the denoised data. Referring to FIG. 5, in one embodiment, the step S201 includes the following steps:

Step S401: performing a filtering operation on position information of the first pose information.

In the embodiment, a first-order low-pass filter is used to perform filtering processing on the collected poses of the joints of the human arm to obtain the low-pass filtered poses of the joints. In the first-order low-pass filtering algorithm, the relationship between the input value x and the output value y is as follows: y=(1−k)x'+kx, where x' represents the last output value and k is the confidence level. When the input value gradually increases or decreases in a certain direction, k will keep increasing. When the input value fluctuates back and forth at a higher frequency or there is a sudden change, k will decrease or approach 0 accordingly.

The Kalman filter is then used to filter the poses of each key point after low-pass filtering to obtain the filtered poses of each joint. During the Kalman filtering process, since the motion of the imitated object (i.e., the human arm) is random, the predicted value X(K|K−1) at the next moment is taken as the optimal result X(K−1|K−1) at the previous moment. Because there are no control variables, the prediction model is as follows: X(K|K−1)=X(K−1|K−1).

Step S402: calculating, according to the orientation information in the first pose information and orientation information of the key points of the human arm to be imitated in a previous motion collection cycle, relative orientation of two successive motion collection cycles.

It should be noted that, in the process of denoising orientation information, conventional methods, such as Euler angle representation method and four-element representation method, will have numerical abrupt changes, which cannot guarantee the accuracy of the denoised data. In the embodiment, denoising processing is performed by using the relative orientation of two successive motion acquiring cycles to ensure the accuracy of the data and improve the similarity of motion imitation.

The calculation formula for relative orientation is: $R=R_{i-1}^{-1}R'_i$, where R represents the relative orientation of the two motion collection cycles before and after a certain key point, $R_{i-1}^{-1}$ represents the inverse matrix of the pose of the previous motion collection cycle, and $R'_i$ represents the pose collected in the current cycle. In this embodiment, the cycle of motion collection may be, but is not limited to, 100 Hz.

Step S403: transforming the relative orientation into Euler angles, and perform filtering operation on Euler angles to obtain filtered orientation information.

The filtered orientation information is $R_i=R_{i-1}R_{filter}$, where $R_{filter}$ represents a matrix after the filtering operation has been performed on the Euler angles, and $R_{i-1}$ represents an orientation of the previous motion collection cycle.

After motion mapping is used to convert the first pose information into the second pose information, and the pose information of the key points of the robot arm is obtained, motion information is converted into angle values of the motion of the joints of the robot arm.

Figure 11:
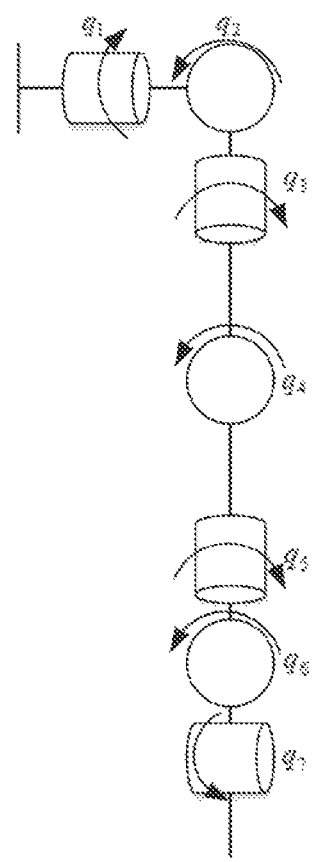
FIG. 11 is a schematic diagram of a model of a robot arm according to one embodiment.

Referring to FIG. 11, in one embodiment, a robot arm is constructed according to the mechanism characteristics of human arm movement, and the robot arm includes seven joints. The first, second, and third joints are used to imitate motion of the shoulder joint of the human arm. The fourth joint is used to imitate the motion of the elbow of the human arm. The fifth, sixth and seventh joints are used to imitate the motion of the wrist of the human arm.

Step S103: determining an angle value of each joint of the arm according to inverse kinematics of the arm based on the second pose information.

Specifically, the inverse kinematics method of a redundant DOF manipulator is used to calculate the arm angle of the motion of the arm, and then the degrees of freedom of each joint are calculated based on the arm angle.

Figure 6:
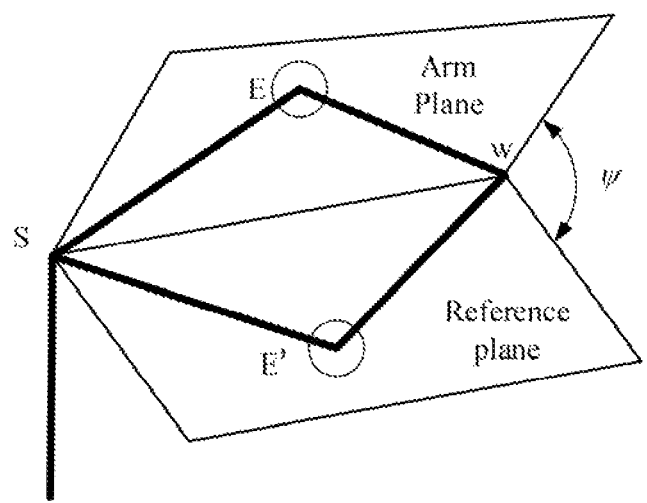
FIG. 6 is a schematic diagram of the formation of an arm angle during the inverse dynamics solution of a humanoid robot arm according to an embodiment.

Refer to the schematic diagram of the formation of the arm angle during the inverse dynamics solution of the humanoid robot arm shown in FIG. 6 and the calculation formula of the arm angle below, the arm angle of the motion of the arm can be obtained based on the inverse kinematics method of a redundant seven-degree-of-freedom manipulator. The calculation formula of the arm angle is as follows:

$$\psi = \frac{\bar{r}_0^T \bar{r}}{\sqrt{\bar{r}^T \bar{r}} \sqrt{\bar{r}_0^T \bar{r}_0}},$$

where ψ represents the arm angle of the motion of the current arm, $\bar{r}_0$ represents the vertical vector of the reference plane, and $\bar{r}$ represents the vertical vector of the current arm plane. It should be noted that the inverse kinematics method of a redundant seven-degree-of-freedom manipulator is known for a person having ordinary skill in the art and has been discussed in many publications. For example, a paper is published in the name of "Analytical Inverse Kinematics for 7 DOF Redundant Manipulators with Joint Limits" by Shimizu et al. in Journal of the Robotics Society of Japan in 2007.

After the arm angle is calculated, the angle value of each joint can be calculated based on the arm angle. The relationship between the angle of each joint and the arm angle is as follows:

$q_1$=arc tan 2(−As(1,1)sin Ψ−Bs(1,1)cos Ψ−Cs(1,1),−As(0,1)sin Ψ−Bs(0,1)cos Ψ−Cs(0,1));

$q_2$=arc sin(−As(2,1)sin Ψ−Bs(2,1)cos Ψ−Cs(2,1));

$q_3$=arc tan 2(−As(2,2)sin Ψ−Bs(2,2)cos Ψ−Cs(2,2),As(2,0)sin Ψ+Bs(2,0)cos Ψ+Cs(2,0));

$q_5$=arc tan 2(Aw(1,2)sin Ψ+Bw(1,2)cos Ψ+Cw(1,2),Aw(0,2)sin Ψ+Bw(0,2)cos Ψ+Cw(0,2));

$q_6$=arc cos(Aw(2,2)sin Ψ+Bw(2,2)cos Ψ+Cw(2,2)); and $q_7$=arc tan 2(Aw(2,0)sin Ψ+Bw(2,0)cos Ψ+Cw(2,0),Aw(2,1)sin Ψ+Bw(2,1)cos Ψ+Cw(2,1)), where As, Bs, Cs, Aw, Bw, Cw are the intermediate transition variables, which can be obtained based on the pose of the elbow and the wrist.

Step S104: controlling the arm to move according to the angle values.

It can be understood that imitation and tracking of the human arm by the robot arm can be realized by controlling the robot arm to perform corresponding motion based on the angle values.

In the embodiment, the first pose information of the human arm is collected, and the angle values of the joints of the robot arm are obtained based on the first pose information. Based on the pose information of the key points of the human arm, the motion of the human arm is converted into the joint angle values of the robot. The method of the present embodiment has the advantages of high imitation similarity and easy implementation.

After calculating the angle value of each joint, the angle values can be transmitted to the robot for motion tracking and imitation. However, this may cause a collision accident and cause damage to the robot. In order to improve the safety and stability during the motion imitation, collision detection can be performed after the joint angle values have been calculated. If the result of collision detection indicates no collision risk, motion tracking is performed according to the calculated joint angle values.

Figure 7:
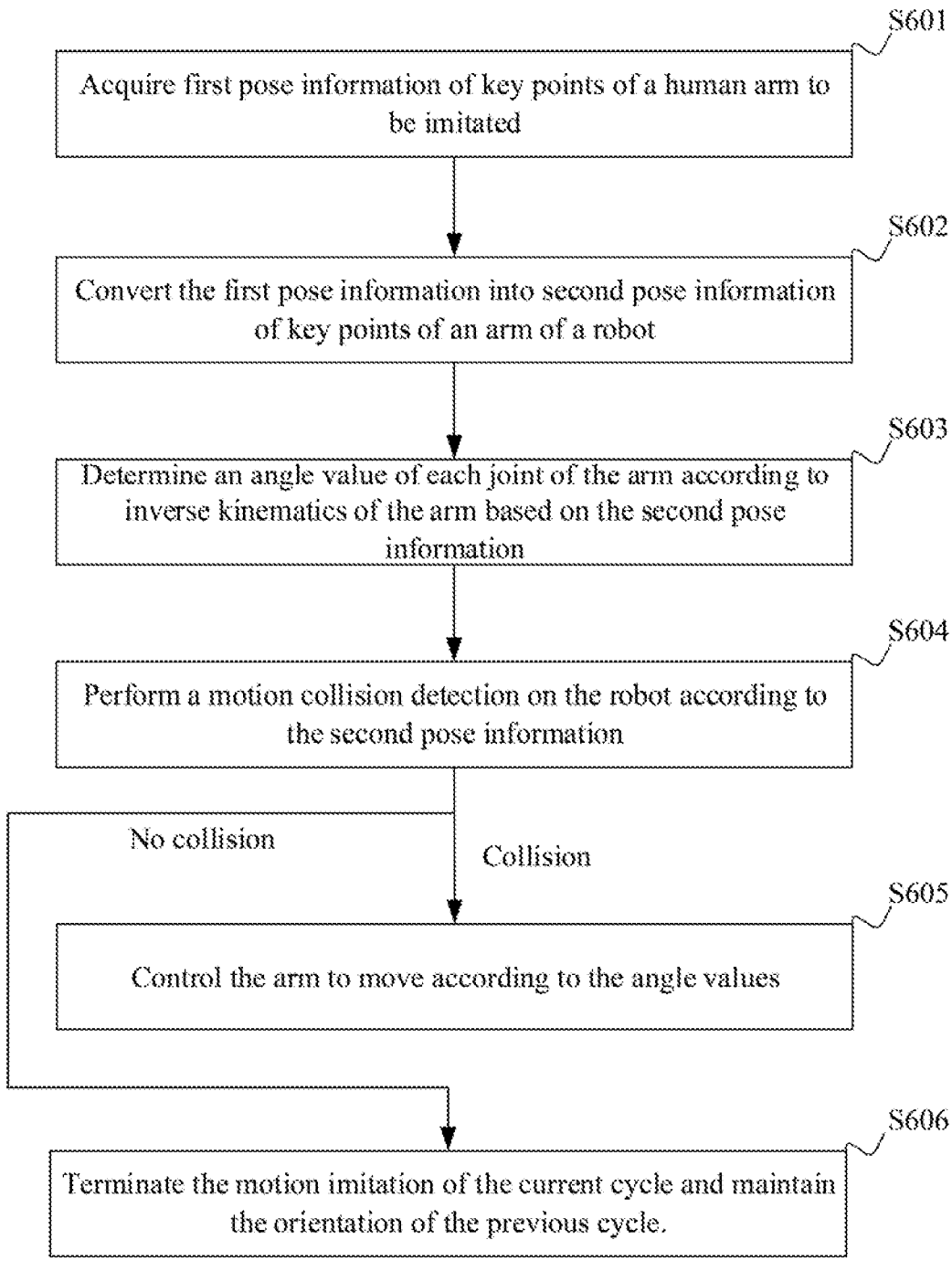
FIG. 7 is a flow chart of a method for controlling the robot of FIG. 1 according to one embodiment.

Referring to FIG. 7, in an alternative embodiment, the method for controlling an arm of the robot 10 to imitate a human arm may include the following steps:

Step S601: acquiring first pose information of key points of a human arm to be imitated.

Step S602: converting the first pose information into second pose information of key points of an arm of a robot.

Step S603: determining an angle value of each joint of the arm according to inverse kinematics of the arm based on the second pose information.

It should be noted that steps S601 to S603 and steps S605 are the same as the steps S101 to S104 above. Please refer to the corresponding content above for related descriptions, which will not be repeated here.

Step S604: performing a motion collision detection on the robot according to the second pose information; and going to the step of controlling the arm to move according to the angle values if no collision has been detected, otherwise going to step S606.

It should be noted that the collision detection may be achieved by any conventional collision detection technology, which is not limited herein. In order to further reduce the computational load of collision detection and improve the real-time performance of motion imitation, a simple and regular-shaped oriented bounding box (OBB) can be used to perform envelope processing on each part of the robot. In this way, it can determine whether there is a collision by determining whether there is a collision in the OBB boxes.

Figure 8:
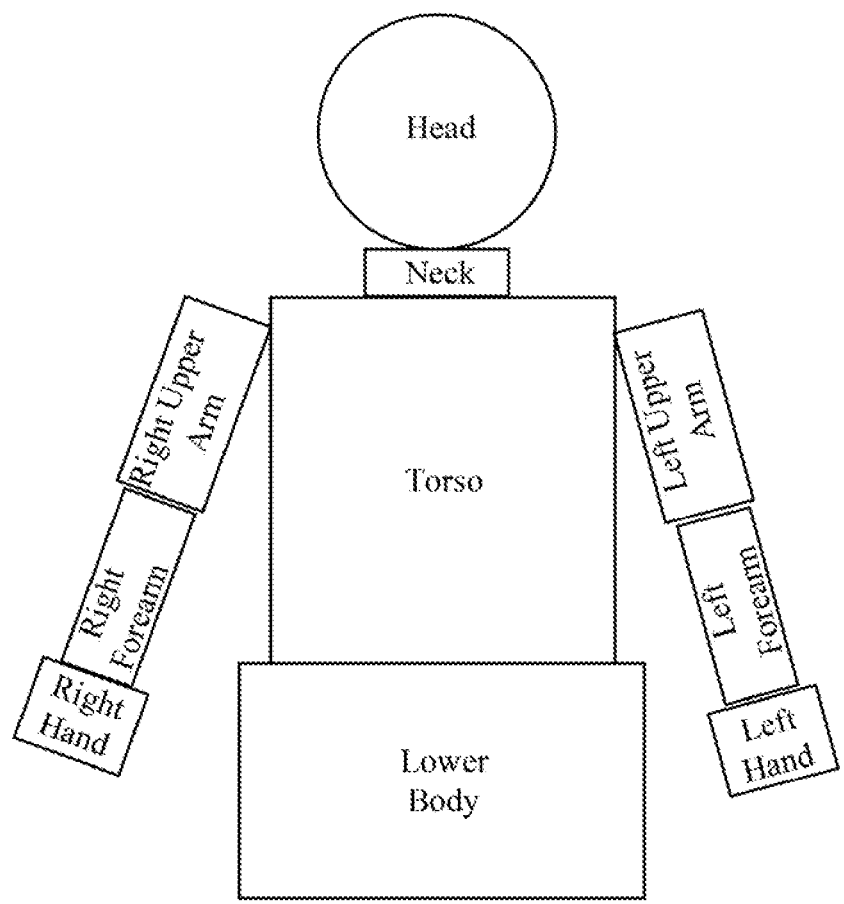
FIG. 8 is a schematic diagram of oriented bounding boxes of each part of the humanoid robot according to an embodiment.

In one embodiment, the method for control the arm of the robot 10 to imitate a human arm may further include performing an envelope processing on each part of the robot using OBBs. In order to fully ensure safety, a certain margin is needed during the envelope process. Referring to the schematic diagram of the envelope of each part of the humanoid robot shown in FIG. 8, the envelope process may include: enveloping the head with a sphere, enveloping the neck and the upper arm and forearm with cylinders, enveloping the torso and hands with cuboids. Since the lower part of the human body may not move during the movement of the human arm, and the human body may be generally in a standing state, a cuboid can be used to envelope the lower part of the human body that may collide with the arm.

Figure 9:
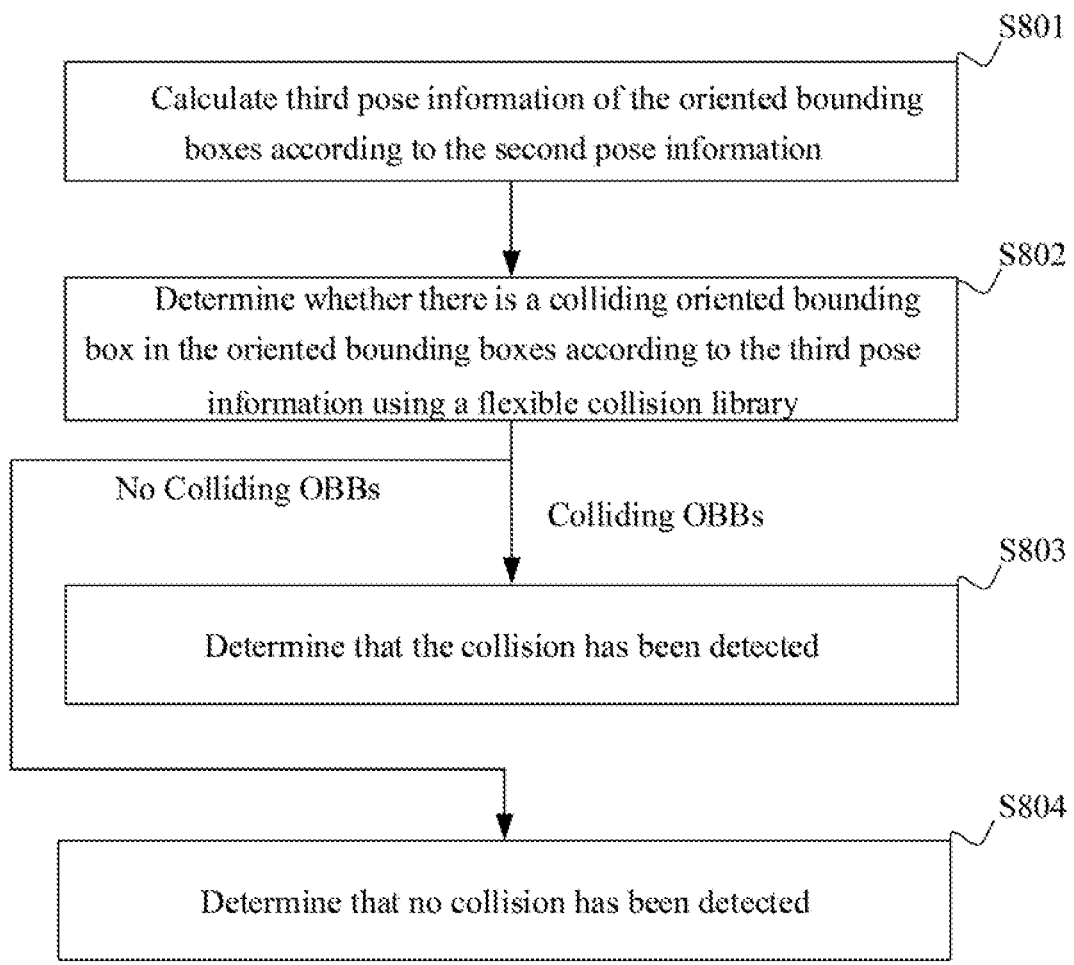
FIG. 9 is a flow chart of a step of the method of FIG. 7.
Figure 10:
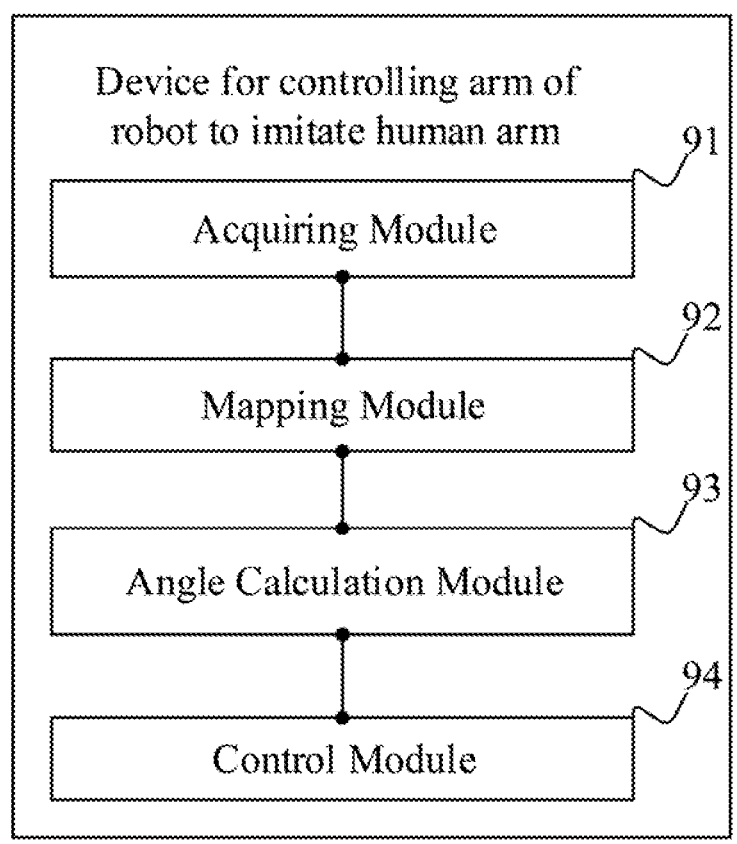
FIG. 10 is a schematic block diagram of a device for controlling the robot of FIG. 1 according to one embodiment.

Referring to FIG. 9, in one embodiment, the step S604 further include the following steps:

Step S801: calculating third pose information of the oriented bounding boxes according to the second pose information.

The pose information of each OBB is required during the collision detection. In actual applications, it needs to calculate the pose information of the upper arm, the forearm and the hand. The pose information of other parts (e.g., the head, neck, torso, and lower body, etc.) is preset.

In one embodiment, the second pose information includes pose information of the robot shoulder, pose information of the robot elbow, and pose information of the robot wrist.

The specific process of calculating the third pose information of the OBBs corresponding to each part of the robot according to the second pose information may include: calculating the position information of the OBB corresponding to the upper arm of the robot according to $P_{uparm}=(P'_S+P'_E)/2$; calculating the position information of the OBB corresponding to the forearm of the robot according to $P_{forearm}=(P'_E+P'_W)/2$; and calculating the position information of the OBB corresponding to the hand of the robot according to $P_{brand}=P'_W+R'_W l_{hand}$.

In the embodiment, the pose information of the OBB corresponding to the upper arm of the robot is obtained according to the position information of the envelope box corresponding to the upper arm of the robot and the orientation information of the robot shoulder. The pose information of the OBB corresponding to the forearm of the robot is obtained according to the position information of the OBB corresponding to the forearm and the orientation information of the robot elbow. The pose information of the OBB corresponding to the hand of the robot is obtained according to the position information of the OBB corresponding to the hand and the orientation information of the robot wrist. Specifically, the pose information of the OBBs can be calculated based on the pose of each key point after the motion mapping. The position calculation process of the robot's large and small arms can be calculated by the following formula. The position of the robot's upper arm and the forearm can be calculated according to the following formula. In addition, the orientation of the upper arm is the orientation of the key points of the shoulder after the motion mapping, and the orientation of the forearm is the orientation of the key points of the elbow after the motion mapping. The calculation formula is as follows: $P_{uparm}=(P'_S+P'_E)/2$ and $P_{forearm}=(P'_E+P'_W)/2$, where $P_{uparm}$ represents the position information of the upper arm, $P_{forearm}$ represents the position information of the forearm, and $P'_S$, $P'_E$ and $P'_W$ represent respectively the position information of the shoulder, the elbow, and the wrist. In addition, the position information of the hand can be calculated according to the formula $P_{hand}=P'_W+R'_W l_{hand}$, where $P_{hand}$ represents the position information of the hand, $l_{hand}$ represents the distance from the center of the hand to the wrist, and $R'_W$ represents the orientation information of the wrist after the motion mapping. The orientation of the hand is the orientation of the key points of the wrist after the motion mapping.

Step S802: determining whether there is a colliding oriented bounding box in the oriented bounding boxes according to the third pose information using a flexible collision library and going to step S803 if there is a colliding oriented bounding box, otherwise going to step S804.

During the motion imitation, mapping and simulation are performed every time the motion data is collected, and the robot arm can perform a collision detection before each imitation. In the embodiment, there are 22 pairs of OBBs that may collide with one another during the movement of the robot arm, as shown in the following table.

| Lookup Table of Possible OBB Collision | | | | | | | | | |
| --- | --- | --- | --- | --- | --- | --- | --- | --- | --- |
| Left Hand | Left Forearm | Left Upper Arm | Right Hand | Right Forearm | Right Upper Arm | Head | Neck | Torso | Lower Body |
| Left Hand | | Yes | Yes | Yes | Yes | Yes | Yes | Yes |

-continued

Lookup Table of Possible OBB Collision

| | Left Hand | Left Forearm | Left Upper Arm | Right Hand | Right Forearm | Right Upper Arm | Head | Neck | Torso | Lower Body |
|---|---|---|---|---|---|---|---|---|---|---|
| Left Forearm | | | | Yes | Yes | | Yes | Yes | Yes | Yes |
| Left Upper Arm | | | | Yes | | | | | | |
| Right Hand | Yes | Yes | Yes | | | | Yes | Yes | Yes | Yes |
| Right Forearm | Yes | Yes | | | | | Yes | Yes | Yes | Yes |
| Right Upper Arm | Yes | | | | | | | | | |

If there is a collision between a pair of OBBs in twenty two pairs of OBBs, it is determined that there will be a collision. The tracking of this cycle is terminated and the orientation of the previous cycle is maintained until there will be no collision between one arm and the body or between the arms. The motion imitation is then performed. If there are no colliding OBBs, it is determined that no collision will occur, and the calculated angle values of joints are sent to the robot arms for imitation of the motion of the human arm.

Step S803: determining that the collision has been detected if the colliding oriented bounding box exists.

Step S804: determining that no collision has been detected if the colliding oriented bounding box does not exist.

Envelope processing is first performed by using OBBs. By determining whether there is contact or collision between two or more OBBs, it can determine whether there will be a collision. In this way, the computational load of collision detection is reduced, the computation speed is improved, and the real-time performance of the motion imitation is improved.

Step S605: controlling the arm of the robot to move according to the angle values.

Step S606: Terminating the motion imitation of the current cycle and maintaining the orientation of the previous cycle.

In the embodiment, motion collision detection is performed on the robot before controlling the robot arm according to the angle values, that is, before performing motion imitation. If there will be no collision in the motion to be imitated, the motion imitation is performed, which ensures the safety of the robot during the motion imitation, and improve the stability of the motion imitation.

It should be noted that the sequence of the steps in the embodiments above does not necessarily mean the sequence of execution. The sequence of execution of each process should be determined by its function and internal logic, and should not constitute any limitation to the implementation process of the embodiments of the present disclosure.

Referring to FIG. 10, in one embodiment, a device for controlling an arm of the robot 10 to imitate a human arm includes an acquiring module 91, a mapping module 92, an angle calculation module 93, and a control module 94. The acquiring module 91 acquires first pose information of key points of a human arm to be imitated. The mapping module 92 converts the first pose information into second pose information of key points of an arm of a robot. The angle calculation module 93 determines an angle value of each joint of the arm according to inverse kinematics of the arm based on the second pose information. The control module 94 controls the arm to move according to the angle values.

In one embodiment, the device further includes a collision detection module that performs a motion collision detection on the robot according to the second pose information. If no collision has been detected, the control module 94 controls the arm to move according to the angle values.

In one embodiment, the device further includes an enveloping module that performs an envelope processing to the robot using oriented bounding boxes. The collision detection module calculates third pose information of the oriented bounding boxes according to the second pose information, determines whether there is a colliding oriented bounding box in the oriented bounding boxes according to the third pose information using a flexible collision library, and determines that the collision has been detected if the colliding oriented bounding box exists, determines that no collision has been detected otherwise.

In one embodiment, the second pose information includes pose information of a shoulder of the robot, pose information of an elbow of the robot, and pose information of a wrist of the robot.

In one embodiment, the collision detection module is further used for:

calculating position information $P_{uparm}$ of one of the oriented bounding box corresponding to an upper arm of the robot according to $P_{uparm}=(P'_S+P'_E)/2$, where $P'_S$ represents the pose information of the shoulder, and $P'_E$ represents the pose information of the elbow;

calculating position information $P_{forearm}$ of one of the oriented bounding box corresponding to a forearm of the robot according to $P_{forearm}=(P'_E+P'_W)/2$, where $P'_W$ represents the pose information of the wrist;

calculating position information $P_{hand}$ of one of the oriented bounding box corresponding to a hand of the robot according to $P_{hand}=P'_W+R'_W l_{hand}$ where $l_{hand}$ represents a distance from a center of a palm of the robot to the wrist, and $R'_W$ represents the orientation information of the wrist of the robot;

acquiring pose information of the oriented bounding box corresponding to the upper arm according to the position information of the oriented bounding box corresponding to the upper arm and the orientation information of the shoulder, acquiring pose information of the oriented bounding box corresponding to the forearm according to the position information of the oriented bounding box corresponding to the forearm and the orientation information of the elbow, and acquiring pose information of the oriented bounding box corresponding to the hand according to the position information of the oriented bounding box corresponding to the hand and the orientation information of the wrist.

The mapping module 92 is further used for:

performing a denoising processing on the first pose information;

establishing a first three-dimensional vector from a shoulder to an elbow of the robot and a second three-dimensional vector from the elbow to a wrist of the robot according to the first pose information that has been denoised;

calculating a first vector module of the first three-dimensional vector and a second vector module of the second three-dimensional vector, respectively;

calculating position information of the elbow and the wrist according to the first three-dimensional vector, the second three-dimensional vector, the first vector module and the second vector module, and length of the upper arm and the forearm; and acquiring the second pose information according to the position information and orientation information in the first pose information.

In one embodiment, the mapping module 92 is further used for:

performing a filtering operation on position information of the first pose information;

calculating, according to the orientation information in the first pose information and orientation information of the key points of the human arm to be imitated in a previous motion collection cycle, relative orientation of two successive motion collection cycles; and transforming the relative orientation into Euler angles, and perform filtering operation on Euler angles to obtain filtered orientation information.

In one embodiment, the relative orientation is calculated according to a formula $R=R_{i-1}^{-1}R'_i$, and the filtered orientation information is obtained according to a formula $R_i=R_{i-1}R_{filter}$, where $R_{i-1}^{-1}$ represents an inverse matrix of an orientation of the previous motion collection cycle, $R'_i$ represents an orientation of a current motion collection cycle, $R_{filter}$ represents a matrix after the filtering operation has been performed on the Euler angles, and $R_{i-1}$ represents an orientation of the previous motion collection cycle.

In one embodiment, the mapping module 92 is further used for calculating the position information of the elbow and the wrist according to $$P_E^r = \frac{l_{SE}\bar{r}_{SE}}{|\bar{r}_{SE}|} \text{ and } P_W^r = \frac{l_{SE}\bar{r}_{SE}}{|\bar{r}_{SE}|} + \frac{l_{EW}\bar{r}_{EW}}{|\bar{r}_{EW}|},$$

where $P_E^r$ and $P_W^r$ represent respectively the position coordinates of the elbow and the wrist, $l_{SE}$ represents the length of the upper arm, $l_{EW}$ represents the length of the forearm, $|\bar{r}_{SE}|$ represents the first three-dimensional vector, $|\bar{r}_{SE}|$ represents the first vector module, $\bar{r}_{EW}$ represents the second three-dimensional vector, and $|\bar{r}_{EW}|$ represents the second vector module.

The device above has a function for implementing the above-mentioned method for controlling the arm of the robot to imitate a human arm. This function can be implemented by hardware or by executing corresponding software by hardware. The hardware or software includes one or more modules corresponding to the above functions, and the modules may be software and/or hardware.

It should be noted that the information interaction, execution process, and other content between the devices/units are based on the same concept as the method embodiments of the present disclosure, and their specific functions and technical effects can be found in the method embodiments, which will not be repeated here.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to needs, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In one embodiment, the present disclosure further provides a computer-readable storage medium. The computer-readable storage medium stores one or more computer programs. When the computer program is executed by a processor, the steps in the foregoing method embodiments are implemented.

In one embodiment, the present disclosure provides a computer program product. When the computer program product is executed by a robot, the robot implements the steps in the foregoing method embodiments.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

In the above-mentioned embodiments, the description of each embodiment has its focuses, and the parts which are not described or mentioned in one embodiment may refer to the related descriptions in other embodiments.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A computer-implemented method for controlling an arm of a robot to imitate a human arm, comprising executing on a processor steps of:
   acquiring first pose information of key points of a human arm to be imitated;
   converting the first pose information into second pose information of key points of an arm of a robot;
   determining an angle value of each joint of the arm according to inverse kinematics of the arm based on the second pose information; and
   controlling the arm to move according to the angle values; wherein the step of converting the first pose information into second pose information of key points of an arm of a robot, comprises;
   performing a denoising processing on the first pose information;
   establishing a first three-dimensional vector from a shoulder to an elbow of the robot and a second three-dimensional vector from the elbow to a wrist of the robot according to the first pose information that has been denoised:
   calculating a first vector modt e of the first three-dimensional vector and a second vect module of the second three-dimensional vector, respectively;
   calculating position information of the elbow and the wrist according to the first three-dimensional vector, the second three-dimensional vector, the first vector module and the second vector module, and length of the upper arm and the forearm: and
   acquiring the second pose information according to the position information and orientation information in the first pose information.

2. The method according to claim 1, further comprising, before the step of controlling the arm to move according to the angle values,
   performing a motion collision detection on the robot according to the second pose information; and
   going to the step of controlling the arm to move according to the angle values if no collision has been detected.

3. The method according to claim 2, further comprising: performing an envelope processing to the robot using oriented bounding boxes; wherein the step of performing a motion collision detection on the robot according to the second pose information, further comprises:
   calculating third pose information of the oriented bounding boxes according to the second pose information;
   determining whether there is a colliding oriented bounding box in the oriented bounding boxes according to the third pose information using a flexible collision library; and
   determining that the collision has been detected if the colliding oriented bounding box exists; otherwise, determining that no collision has been detected.

4. The method according to claim 3, wherein the second pose information includes pose information of a shoulder of the robot, pose information of an elbow of the robot, and pose information of a wrist of the robot; the step of calculating third pose information of the oriented bounding boxes according to the second pose information further comprises:
   calculating position information $P_{uparm}$ of one of the oriented bounding box corresponding to an upper arm of the robot according to $P_{uparm}=(P'_S+P'_E)/2$, where $P'_S$ represents the position information of the shoulder, and $P'_E$ represents the position information of the elbow;
   calculating position information $P_{forearm}$ of one of the oriented bounding box corresponding to a forearm of the robot according to $P_{forearm}=(P'_E+P'_W)/2$, where $P'_W$ represents the position information of the wrist;
   calculating position information $P_{hand}$ of one of the oriented bounding box corresponding to a hand of the robot according to $P_{hand}=P'_W+R'_W l_{hand}$, where $l_{hand}$ represents a distance from a center of a palm of the robot to the wrist, and $R'_W$ represents an orientation information of the wrist of the robot;
   acquiring pose information of the oriented bounding box corresponding to the upper arm according to the position information of the oriented bounding box corresponding to the upper arm and the orientation information of the shoulder,
   acquiring pose information of the oriented bounding box corresponding to the forearm according to the position information of the oriented bounding box corresponding to the forearm and the orientation information of the elbow, and acquiring pose information of the oriented bounding box corresponding to the hand according to the position information of the oriented bounding box corresponding to the hand and the orientation information of the wrist.

5. The method according to claim 1, wherein the step of performing a denoising processing on the first pose information, comprises:
   performing a filtering operation on position information of the first pose information;
   calculating, according to the orientation information in the first pose information and orientation information of the key points of the human arm to be imitated in a previous motion collection cycle, relative orientation of two successive motion collection cycles; and
   transforming the relative orientation into Euler angles, and performing filtering operation on Euler angles to obtain filtered orientation information.

6. The method according to claim 5, wherein the relative orientation is calculated according to a formula $R = R_{i-1}^{-1} R'_i$, and the filtered orientation information is obtained according to a formula $R_i = R_{i-1} R_{filter}$, where $R_{i-1}^{-1}$ represents an inverse matrix of an orientation of the previous motion collection cycle, $R'_i$ represents an orientation of a current motion collection cycle, $R_{filter}$ represents a matrix after the filtering operation has been performed on the Euler angles, and $R_{i-1}$ represents an orientation of the previous motion collection cycle.

7. The method according to claim 1, wherein the position information of the elbow and the wrist is respectively calculated according to $$P_E^r = \frac{l_{SE} \bar{r}_{SE}}{|\bar{r}_{SE}|} \text{ and } P_W^r = \frac{l_{SE} \bar{r}_{SE}}{|\bar{r}_{SE}|} + \frac{l_{EW} \bar{r}_{EW}}{|\bar{r}_{EW}|},$$

where $P_E^r$ and $P_W^r$ represent respectively the position coordinates of the elbow and the wrist, $l_{SE}$ represents the length of the upper arm, $l_{EW}$ represents the length of the forearm, $|\bar{r}_{SE}|$ represents the first three-dimensional vector, $|\bar{r}_{SE}|$ represents the first vector module, $\bar{r}_{EW}$ represents the second three-dimensional vector, and $|\bar{r}_{EW}|$ represents the second vector module.

8. A robot comprising:
   one or more processors;
   a storage; and
   one or more computer programs stored in the storage and configured to be executed by the one or more processors, and the one or more computer programs being configured to execute a method, the method comprising steps of:
   acquiring first pose information of key points of a human arm to be imitated;
   converting the first pose information into second pose information of key points of an arm of a robot;
   determining an angle value of each joint of the arm according to inverse kinematics of the arm based on the second pose information; and
   controlling the arm to move according to the angle values;
   wherein the step of converting the first pose information into second pose information of key points of an arm of a robot, comprises:
   performing a denoising processing on the first pose information;
   establishing a first three-dimensional vector from a shoulder to an elbow of the robot and a second three-dimensional vector from the elbow to a wrist of the robot according to the first pose information that has been denoised;
   calculating a first vector module of the first three-dimensional vector and a second vector module of the second three-dimensional vector, respectively;
   calculating position information of the elbow and the wrist according to the first three- dimensional vector, the second three-dimensional vector. the first vector module and the second vector module, and length of the upper arm and the forearm; and
   acquiring the second pose information according to the position information and orientation information in the first pose information.

9. The robot according to claim 8, further comprising, before the step of controlling the arm to move according to the angle values,
   performing a motion collision detection on the robot according to the second pose information; and
   going to the step of controlling the arm to move according to the angle values if no collision has been detected.

10. The robot according to claim 9, further comprising: performing an envelope processing to the robot using oriented bounding boxes; wherein the step of performing a motion collision detection on the robot according to the second pose information, further comprises:
    calculating third pose information of the oriented bounding boxes according to the second pose information;
    determining whether there is a colliding oriented bounding box in the oriented bounding boxes according to the third pose information using a flexible collision library; and
    determining that the collision has been detected if the colliding oriented bounding box exists; otherwise, determining that no collision has been detected.

11. The robot according to claim 10, wherein the second pose information includes pose information of a shoulder of the robot, pose information of an elbow of the robot, and pose information of a wrist of the robot; the step of calculating third pose information of the oriented bounding boxes according to the second pose information further comprises:
    calculating position information $P_{uparm}$ of one of the oriented bounding box corresponding to an upper arm of the robot according to $P_{uparm} = (P'_S + P'_E)/2$, where $P'_S$ represents the position information of the shoulder, and $P'_E$ represents the position information of the elbow;
    calculating position information $P_{forearm}$ of one of the oriented bounding box corresponding to a forearm of the robot according to $P_{forearm} = (P'_E + P'_W)/2$, where $P'_W$ represents the position information of the wrist;
    calculating position information $P_{hand}$ of one of the oriented bounding box corresponding to a hand of the robot according to $P_{hand} = P'_W + R'_W l_{hand}$, where $l_{hand}$ represents a distance from a center of a palm of the robot to the wrist, and $R'_W$ represents an orientation information of the wrist of the robot;
    acquiring pose information of the oriented bounding box corresponding to the upper arm according to the position information of the oriented bounding box corresponding to the upper arm and the orientation information of the shoulder,
    acquiring pose information of the oriented bounding box corresponding to the forearm according to the position information of the oriented bounding box corresponding to the forearm and the orientation information of the elbow, and acquiring pose information of the oriented bounding box corresponding to the hand according to the position information of the oriented bounding box corresponding to the hand and the orientation information of the wrist.

12. The robot according to claim 8, wherein the step of performing a denoising processing on the first pose information, comprises:
    performing a filtering operation on position information of the first pose information;
    calculating, according to the orientation information in the first pose information and orientation information of the key points of the human arm to be imitated in a previous motion collection cycle, relative orientation of two successive motion collection cycles; and
transforming the relative orientation into Euler angles, and performing filtering operation on Euler angles to obtain filtered orientation information.

13. The robot according to claim 12, wherein the relative orientation is calculated according to a formula $R=R_{i-1}^{-1}R'_i$, and the filtered orientation information is obtained according to a formula $R_i=R_{i-1}R_{filter}$, where $R_{i-1}^{-1}$ represents an inverse matrix of an orientation of the previous motion collection cycle, $R'_i$ represents an orientation of a current motion collection cycle, $R_{filter}$ represents a matrix after the filtering operation has been performed on the Euler angles, and $R_{i-1}$ represents an orientation of the previous motion collection cycle.

14. The robot according to claim 8, wherein the position information of the elbow and the wrist is respectively calculated according to $$P_E^r = \frac{l_{SE}\bar{r}_{SE}}{|\bar{r}_{SE}|} \text{ and } P_W^r = \frac{l_{SE}\bar{r}_{SE}}{|\bar{r}_{SE}|} + \frac{l_{EW}\bar{r}_{EW}}{|\bar{r}_{EW}|},$$

where $P_E^r$ and $P_W^r$ represent respectively the position coordinates of the elbow and the wrist, $l_{SE}$ represents the length of the upper arm, $l_{EW}$ represents the length of the forearm, $|\bar{r}_{SE}|$ represents the first three-dimensional vector, $|\bar{r}_{SE}|$ represents the first vector module, $\bar{r}_{EW}$ represents the second three-dimensional vector, and $|\bar{r}_{EW}|$ represents the second vector module.

15. A computer readable storage medium having stored therein instructions, which when executed by a robot, cause the robot to:
    acquire first pose information of key points of a human arm to be imitated;
    convert the first pose information into second pose information of key points of an arm of a robot;
    determine an angle value of each joint of the arm according to inverse kinematics of the arm based on the second pose information, and
    control the arm to move according to the angle values;
    wherein the instructions further cause the robot to:
    perform a denoising processing on the first pose information;
    establish a first three-dimensional vector from a shoulder to an elbow of the robot and a second three-dimensional vector from the elbow to a wrist of the robot according to the first pose information that has been denoised;
    calculate a first vector module of the first three-dimensional vector and a second vector module of the second three-dimensional vector, respectively;
    calculate position information of the elbow and the wrist according to the first three-dimensional vector, the second three-dimensional vector, the first vector module and the second vector module, and length of the upper arm and the forearm; and
    acquire the second pose information according to the position information and orientation information in the first pose information.

16. The computer readable storage medium having stored therein instructions according to claim 15, wherein the instructions further cause the robot to, before controlling the arm to move according to the angle values, perform a motion collision detection on the robot according to the second pose information; and control the arm to move according to the angle values if no collision has been detected.

17. The computer readable storage medium having stored therein instructions according to claim 16. wherein the instructions further cause the robot to:
    perform an envelope processing to the robot using oriented bounding boxes;
    calculate third pose information of the oriented bounding boxes according to the second pose information;
    determine whether there is a collidingg oriented bounding box in the oriented bounding boxes according to the third pose information using a flexible collision library; and
    determine that the collision has been detected if the colliding oriented bounding box exists;
    otherwise, determining that no collision has been detected.

18. The computer readable storage medium having stored therein instructions according to claim 17, wherein the second pose information includes pose information of a shoulder of the robot, pose information of an elbow of the robot, and pose information of a wrist of the robot; the instructions further cause the robot to:
    calculate position information $P_{uparm}$ of one of the oriented bounding box corresponding to an upper arm of the robot according to $P_{uparm}=(P'_S+P'_E)/2$, where $P'_S$ represents the position information of the shoulder, and $P'_E$ represents the position information of the elbow;
    calculate position information $P_{forearm}$ of one of the oriented bounding box corresponding to a forearm of the robot according to $P_{forearm}=(P'_E+P'_W)/2$, where $P'_W$ represents the position information of the wrist;
    calculate position information $P_{hand}$ of one of the oriented bounding box corresponding to a hand of the robot according to $P_{hand}=P'_W+R'_W l_{hand}$, where $l_{hand}$ represents a distance from a center of a palm of the robot to the wrist, and $R'_W$ represents an orientation information of the wrist of the robot;
    acquire pose information of the oriented bounding box corresponding to the upper arm according to the position information of the oriented bounding box corresponding to the upper arm and the orientation information of the shoulder,
    acquire pose information of the oriented bounding box corresponding to the forearm according to the position information of the oriented bounding box corresponding to the forearm and the orientation information of the elbow, and
    acquire pose information of the oriented bounding box corresponding to the hand according to the position information of the oriented bounding box corresponding to the hand and the orientation information of the wrist.

19. The computer readable storage medium having stored therein instructions according to claim 15, wherein the instructions further cause the robot to:

perform a filtering operation on position information of the first pose information;

calculate, according to the orientation information in the first pose information and orientation information of the key points of the human arm to be imitated in a previous motion collection cycle, relative orientation of two successive motion collection cycles; and transform the relative orientation into Euler angles, and performing filtering operation on Euler angles to obtain filtered orientation information.

20. The computer readable storage medium having stored therein instructions according to claim 19, wherein the relative orientation is calculated according to a formula $R=R_{i-1}^{-1}R'_i$, and the filtered orientation information is obtained according to a formula $R_i=R_{i-1}R_{filter}$, where $R_{i-1}^{-1}$ represents an inverse matrix of an orientation of the previous motion collection cycle, $R'_i$ represents an orientation of a current motion collection cycle, $R_{filter}$ represents a matrix after the filtering operation has been performed on the Euler angles, and $R_{i-1}$ represents an orientation of the previous motion collection cycle.

* * * * *